United States Patent
Broekaert et al.

(10) Patent No.: US 8,654,202 B2
(45) Date of Patent: Feb. 18, 2014

(54) CORRECTION OF CAPTURED AND STABILIZED IMAGES

(75) Inventors: Michel Broekaert, Paris (FR); Joël Budin, Paris (FR)

(73) Assignee: Sagem Defense Securite, Paris (FR)

( * ) Notice: Subject to any disclaimer, the term of this patent is extended or adjusted under 35 U.S.C. 154(b) by 235 days.

(21) Appl. No.: 12/867,173

(22) PCT Filed: Feb. 12, 2009

(86) PCT No.: PCT/EP2009/051661
§ 371 (c)(1),
(2), (4) Date: Oct. 28, 2010

(87) PCT Pub. No.: WO2009/101151
PCT Pub. Date: Aug. 20, 2009

(65) Prior Publication Data
US 2011/0037860 A1    Feb. 17, 2011

(30) Foreign Application Priority Data
Feb. 12, 2008    (FR) .................... 08 50880

(51) Int. Cl.
*H04N 5/228*    (2006.01)
*G06K 9/40*    (2006.01)

(52) U.S. Cl.
USPC ....................... 348/208.4; 382/255

(58) Field of Classification Search
None
See application file for complete search history.

(56) References Cited

U.S. PATENT DOCUMENTS

| 5,502,482 A | 3/1996 | Graham |
| 6,642,497 B1 | 11/2003 | Apostolopoulos et al. |
| 8,009,197 B2 * | 8/2011 | Ben-Ezra et al. .......... 348/208.1 |
| 2003/0031382 A1 | 2/2003 | Broekaert |
| 2003/0063814 A1 * | 4/2003 | Herley .......................... 382/255 |

FOREIGN PATENT DOCUMENTS

| EP | 1783686 | 5/2007 |
| FR | 2828315 | 2/2003 |

OTHER PUBLICATIONS

Influence of Signal-to-Noise Ratio and Point Spread Function on Limits of Super-Resolution, by Pham T.Q., Van Vliet L.J., and Shutte K., Proceedings of SPIE-IS&T vol. 5672, 2005, XP002495298, pp. 170-171, Figure 1.

Jitter-Camera: a Super-Resolution Video Camera, Ben-Ezra M., Zomet A. and Nayar S.K., Proceedings of SPIE-IS&T Electronic Imaging vol. 6077, 2005, XP002495750, pp. 4-7, Figures 3-5.

(Continued)

*Primary Examiner* — Albert Cutler
(74) *Attorney, Agent, or Firm* — Miller, Matthias & Hull LLP

(57) ABSTRACT

In a system for capturing a series of images of a scene comprising an image capture device having a matrix of flux detectors which is oriented along a sighting axis (z), comprising a stabilizing module which stabilizes the sighting axis of the captured images, the sighting axis being instilled with a defined, cyclic, motion, the following steps are applied to a series of successive images ($N_{1-K}$) captured during a cycle. Steps /i/ and /ii/ are repeated from the first image captured up to the last image captured of the series and an intermediate image ($I_{Intermediate}$) is obtained •–/i/ registering a subsequent image (Ni+i) on a preceding image ($N_i$) as a function of the defined motion; –/ii/ correcting spatial noise relating to the flux detectors and affecting the common part of the images. Next, a corrected captured image of the scene is obtained by applying a convolution product between the intermediate image and a correction point spreading function ($PSF_{global}$) which is determined on the basis of the defined motion.

16 Claims, 2 Drawing Sheets

(56) References Cited

OTHER PUBLICATIONS

Super Resolution from Image Sequences, Irani M. et al., Proceedings of the International Conference of Pattern Recognition, vol. 2, 1990, pp. 115-120.

Super-Resolution Image Reconstruction: a Technical Overview, Min Kyu Park et al., IEEE Signal Processing Magazine, vol. 20, May 2003, pp. 21-36.

French Search Report issued in corresponding French Patent Application No. FR 08 50880; report dated Sep. 15, 2008.

International Search Report issued in corresponding PCT Patent Application No. PCT/EP2009/051661; report dates Jul. 28, 2009.

\* cited by examiner

CORRECTION OF CAPTURED AND STABILIZED IMAGES

CROSS-REFERENCE TO RELATED APPLICATIONS

This application is a U.S. national stage filing under 35 USC §371 of International Patent Application No. PCT/EP2009/051661 filed on Feb. 12, 2009, which claims priority under the Paris Convention to the French Patent Application No. 08 50880, filed on Feb. 12, 2008.

FIELD OF THE DISCLOSURE

The present invention relates to a method of processing images captured by an image capture device such as a camera or binoculars, and more specifically a correction of an effect known as "motion", "motion blur" or "image motion" in the captured images.

BACKGROUND OF THE DISCLOSURE

Images captured by an image capture device may suffer from degradation of the image quality which may be caused by defects of the image sensor itself, defects arising from integration of the captured light in the sensor, or forms of degradation such as motion blur, which are due to elements external to the sensor.

Motion blur is a form of degradation which may affect a captured image if the sighting axis is moving at the moment when the image is captured. This degradation may be seen in the image in the form of a visible image motion which causes a blurred area to appear in a captured scene. Thus the movement blur generally originates in a motion of the sighting axis of the capture device during the image capture.

If a camera is carried by a moving support, such as a person who is walking or even stationary, or a vehicle, the captured images may show a motion blur in the form of visual effects that degrade the image quality. The captured image which is affected by the motion blur can be represented by a convolution product between a point spread function (PSF) associated with the motion blur and the captured original scene O within the captured image. Consequently there are known methods of correcting a captured image affected by motion blur, based on a deconvolution of the captured image with a point spread function which can represent the motion blur that has affected the captured image. More precisely, this deconvolution operation corresponds to the convolution product between the captured image and the point spread function associated with the motion blur. This deconvolution can be implemented, for example, by applying a filter (a Fourier-based Wiener filter, or other algorithms using other bases, as described in 'A Wavelet Tour of Signal Processing' by Stéphane Mallat.

However, in order to apply these methods, it is desirable to determine a motion blur shape which has affected the image to be corrected, for the purpose of defining the point spread function associated with it. A deconvolution operation based on this associated function can then be carried out.

The implementation of a procedure of this kind may require complex calculations. It is also desirable to base this procedure of determining the point spread function associated with a motion blur on certain assumptions which may subsequently prove to be either more or less appropriate and which may therefore result in an unsatisfactory correction of the captured image.

Image capture systems are adapted to reduce these visual effects. In some systems, this is done by stabilizing the sighting axis by incorporating a mechanical inertial stabilization module in the camera or by mounting the camera on a mechanical module such as a platform which provides inertial stabilization. The mechanisms of these systems can be controlled according to information obtained from gyroscopes. They can therefore be used to stabilize the sighting axis of a camera in an inertial frame of reference. In these conditions it becomes possible to capture images completely independently of any irregular movements affecting the support of the camera which is used. This image capture system based on an inertial frame of reference provides an effective way of avoiding the visual effects, that is to say the movement blur, caused by irregular movements of the camera support.

Other types of image capture systems can incorporate a digital stabilization module designed to stabilize the captured images by digitally processing them.

However, even if the motion blur is reduced by an inertial control of the motion of the sighting axis, there may be some disturbance in the captured images, due to fixed spatial noise.

The term "spatial noise" denotes an undesirable difference (or offset) between the values of pixels of a single image which should theoretically be equal when the pixels correspond to the same input signal. This type of degradation may be due to the intrinsic properties of the capture device concerned.

A digital image is represented by a matrix of pixels, each corresponding to a color level or a gray level of the image. An image corresponds to a scene captured by a matrix of flux sensors, the light energy received by these sensors being converted subsequently into corresponding electrical signals. The different sensors in the sensor matrix are usually theoretically identical, but in practice there are differences between them which lead to undesirable offsets, as defined above, between the different pixels of a captured image of a scene corresponding to an incoming flux which is identical at every point of the captured image, thus giving rise to spatial noise in this image.

This spatial noise can be corrected by capturing an image of a black body and calculating the undesirable offsets between the different pixels captured by the flux sensors of the matrix, so that these offsets can be corrected in the next images captured. However, this form of correction requires an interruption in the image capture process.

Since the offsets between the values of the pixels of a single image due to spatial noise may vary over time, as a function of temperature for example, it may be useful to repeat the procedure of correcting these offsets regularly in the course of the image capture, without interrupting the image capture operation.

In an image capture system with inertial stabilization, spatial noise creates a troublesome disturbance, because disturbances due to the motion of the sighting axis are prevented. This makes it even more desirable to be able to correct the spatial noise in this context.

It should therefore be noted that, on the one hand, captured images may be affected by motion blur in an image capture system in which the motion of the sighting axis is not inertially stabilized, while, on the other hand, captured images may be affected by disturbances due to spatial noise in an image capture system in which the motion of the sighting axis is inertially stabilized.

SUMMARY OF THE DISCLOSURE

The present invention is intended to overcome the aforesaid problems.

A first aspect of the present invention relates to a method of processing images in a system for capturing a series of images of a scene comprising an image capture device having a matrix of flux sensors oriented along a sighting axis,
said image capture device comprising a stabilization module which stabilizes the sighting axis of the captured images, said sighting axis being subjected to a specified cyclic motion having an amplitude of n pixels in each cycle at the flux sensor matrix, n being a whole number greater than 2 and smaller than $n_{max}$, $n_{max}$ being determined in such a way that the images captured in each cycle have a predominantly common part;
said method comprising the following steps, applied to a series of successive images captured during a cycle:
  /1/ repeating steps /i/ and /ii/ from the first captured image to the last captured image of said series and obtaining an intermediate image:
    /i/ registering a subsequent image of said series of images on a preceding image as a function of the defined motion;
    /ii/ correcting a spatial noise relating to the flux sensors and which affects the common part of the images of said series of images, as a function of at least one measured offset between a value of a reference pixel in the common part of the preceding image and a value of a subsequent pixel which represents the same point of said scene as the reference pixel in said common part of the subsequent image;
  /2/ obtaining a corrected captured image of the scene by applying a convolution product between said intermediate image and a point spread function, said point spread function being determined according to the defined motion.

In this context, the term "stabilization module" denotes a module for stabilizing the sighting axis of the captured images either digitally or mechanically or by a combined digital and mechanical method. The term "sighting axis" in relation to a captured image denotes the center of the captured image.

When the stabilization module stabilizes the sighting axes of captured images by digital image processing, it may be based on a function for choosing the best stabilized image estimate.

By means of these arrangements, and more specifically by means of the controlled motion imparted to the sighting axis of the capture device, it is possible to correct both the spatial noise affecting the captured images and the motion blur in an appropriate way. The motion of the image capture device The spatial noise affecting the captured images can advantageously be corrected on the basis of the motion imparted to the sighting axis, since this motion enables a single sensor of the sensor matrix to be exposed to different points of the captured scene in the course of the cycle of the motion in question. On the basis of these different exposures, it is possible to correct the offsets of each of the detectors, while continuing to capture images. Since the sighting axis of an image capture device is subjected to a defined motion, it is then advantageously possible to provide a correction of the offset of the pixel values in order to correct the spatial noise on the basis of the succession of captured images. Thus it is not necessary to interrupt the image capture process in order to make this correction.

By thus introducing a controlled destabilization of the images captured in a system having an image stabilization module, it becomes advantageously possible to determine a defined motion adapted to the requirement of image processing for correcting spatial noise. Thus the knowledge of this motion can be used subsequently to calculate corrections of the spatial noise.

The stabilization module is adapted to stabilize the successively captured images, either digitally, or by means of mechanisms of the inertial gyroscopic type which control the sighting axis initially.

For example, this defined motion can be used to optimize the application of an image processing method such as that which is used in an image capture context by an image capture system which is not stabilized, and which therefore has irregular motions of the sighting axis created by the support of the system, as described in FR 2 828 315. The spatial noise can thus be corrected without interrupting the image capture, while benefiting from the advantages of an image capture system with either inertial or digital stabilization.

This motion of the sighting axis of the capture device introduces a motion blur into the captured images. This motion blur can be appropriately corrected in the captured images according to one embodiment of the present invention.

It should be noted that this image processing method can advantageously be used in cases where the integration of the flux sensors is virtually permanent, as in the case of uncooled infrared sensors (such as those known as bolometers). This is because, in this case, by contrast with certain prior art processes, a motion is imparted either at constant velocity or at constant acceleration, regardless of the integration periods of the sensors. It is even more advantageous to impart a motion to the sighting axis regardless of the integration periods of the sensors, because these integration periods can vary according to the external conditions, for example the climatic conditions. This motion can therefore be concomitant with the integration periods.

The defined motion can be imparted at constant velocity or at constant acceleration.

In one embodiment of the present invention, the motion blur can be corrected in a series of captured images corresponding to those captured at least during the period in which the sighting axis passes through the complete motion cycle which is imparted to it. This series of images is denoted $N_i$ where i is in the range from 1 to K. A point spread function PSF corresponds to the motion blur accumulated in this series of captured images.

The term "predominantly common part" denotes a given part which is found in a plurality of images and which occupies the predominant part of these images.

The defined motion is a cyclic motion; that is to say, it causes the sighting axis to be periodically oriented in the same orientation. This makes it possible to apply a correction of the spatial noise which converges.

This defined motion also has an amplitude within a number n greater than 2, such that it is possible to move over the neighboring pixels of a pixel whose value is to be corrected. This amplitude of the defined motion also remains below a maximum number which must enable a predominantly common part to be found in a series of successive captured images in the course of a motion cycle, to enable a correction to be made, for example, over a large range of the images.

In one embodiment of the present invention, the corrective point spread function obeys the following equation:

$$PSF_{global}(x, y, N_{1-k}) = PSF_{capt}(x, y) \otimes \sum_{i=1}^{k} PSF_{motion}(x, y, N_i) + \sum_{i=1}^{k} B(x, y, N_i)$$

where $PSF_{global}$ is the corrective point spread function;

x and y are the coordinates of a sensor within the sensor matrix;

$N_{1-k}$ is the series of captured images, each captured image being represented by an index $N_i$ where i is in the range from 1 to k, k being greater than 1;

$PSF_{capt}$ is a point spread function relating to the capture device at a sensor with the coordinates x and y in the matrix;

$PSF_{motion}$ is a point spread function relating to the defined motion of the sighting axis; and $B(x,y,N_i)$ represents the sum of the temporal and spatial noises affecting a captured image with the index $N_i$ and obeys the following equation:

$$B(x,y,N_i)=B\text{temp}(x,y,N_i)+Bsf(x,y)+B\text{sam}(x,y,N_i)$$

$B\text{temp}(x,y,N_i)$ represents the temporal photon or electron noise;

$Bsf(x,y)$ represents the fixed or slowly variable spatial noise;

and $B\text{sam}(x,y,N_i)$ represents the spatial noise due to sampling.

This point spread function is adapted to correct the motion blur introduced by the defined motion.

By applying a convolution product between the corrective point spread function and the intermediate image, it is a simple matter to obtain a captured image of the scene in question in which both the spatial noise and the motion blur introduced by the defined motion are corrected. The temporal and sampling noises decrease with the number k of images added together, and make the deconvolution easier.

The stabilization module can be adapted to stabilize the captured images on the basis of digital processing of the images.

Alternatively, the stabilization module can be a mechanical inertial stabilization module.

The defined motion may, for example, correspond to a circle having a diameter with a size equal to or greater than three pixels at the position of the flux sensor matrix.

Advantageously, since the motion imparted to the sighting axis is controlled, its velocity can be determined as a function of the integration time of the flux sensors of the sensor matrix of the image capture device.

It is also possible, for example, to provide a defined motion in the form of a rosette, describing a number of arcs having different radii and centers.

In one embodiment of the present invention, values of pixels of the common part of a preceding and a subsequent image are corrected in succession, on the basis on the measured offset, by moving along a chain of pixels which, starting from the reference pixel in the preceding image, comprise pixels corresponding to each other alternately in the subsequent image and in the preceding image, with a pixel of the subsequent image corresponding to a pixel of the preceding image when said pixels correspond to the same point of the captured scene, and with a pixel of the preceding image corresponding to a pixel of the subsequent image when said pixels correspond to the same flux sensor of the sensor matrix.

Thus it may be advantageous to determine the position of the reference pixel in the common part as a function of the defined motion and of a time interval which elapses between the captured images. This is because the direction of scanning of the images by the chain of correction pixels can be deduced from the position of the chosen reference pixel and from the defined motion. It is therefore advantageous to choose a pixel which enables a long chain of pixels to be obtained.

In one embodiment of the present invention, since the motion imparted to the sighting axis is defined, the spatial noise can be corrected by applying a motion which is the inverse of the defined motion to the successively captured images, so as to counterbalance the motion of the sighting axis and thus enable the images to be readjusted correctly. The position of the subsequent pixel in the subsequent image can then be determined from the position of the reference pixel in the preceding image as a function of the characteristics of the defined motion applied to the sighting axis and of a time interval elapsing between the successive images. This procedure can then be continued along the whole chain of correction pixels.

However, even if the motion imparted to the sighting axis is theoretically known with a high degree of accuracy, this motion may in practice be affected by noise. In such a case, it may be desirable to use a digital image processing method by which the motion of the same points of a scene can be determined precisely from a preceding image to a subsequent image.

For this purpose, it may be advantageous to use a digital processing method for determining the motion of the sighting axis between two consecutive images, such as that described in FR 2 828 315 or that described in U.S. Pat. No. 5,502,482. The use of this processing method advantageously enables very good performance to be obtained in respect of spatial noise correction.

Thus, in another embodiment of the present invention, the defined motion is measured by applying digital processing of the preceding and subsequent images.

In the method proposed by the present invention, by contrast with what is described by the aforesaid documents, the motion of the sighting axis is controlled and known. This results in a better image quality than that which can be obtained in a system without stabilization.

In the present case it is possible to determine a motion which can be used both to correct the spatial noise and to limit the visual effects which may be caused, for example, by movements of the sighting axis which are too fast with respect to the integration time of the sensors, such as image motions, in other words a degradation described by a point spread function (PSF). This is because the motion imparted to the sighting axis can advantageously be defined on the basis of the integration time of the sensors used.

The control of this motion of the sighting axis makes it possible to prevent the introduction of high-frequency destabilization of the captured images, whereas this may occur in an image capture system with digital stabilization such as that described in FR 2 828 315.

A method according to an embodiment of the present invention can be highly advantageous, for example, in the case in which no motion is imparted to the support of the camera capturing the series of images in question, and in which the captured scene is a static scene. In this case, the defined motion applied to the sighting axis makes it possible to achieve a high quality of the images processed according to an embodiment of the present invention.

According to a second aspect, the present invention proposes a system for capturing a series of images adapted for the application of an image processing method according to the first aspect of the present invention.

According to a third aspect, the present invention proposes a computer program for installation in a capture system according to the second aspect of the present invention, comprising instructions for applying the method according to the first aspect of the present invention when the program is executed by processing means of the capture system.

BRIEF DESCRIPTION OF THE DRAWINGS

The invention will be more clearly understood with the aid of the drawings, in which.

DETAILED DESCRIPTION OF THE DISCLOSURE

Figure 1:
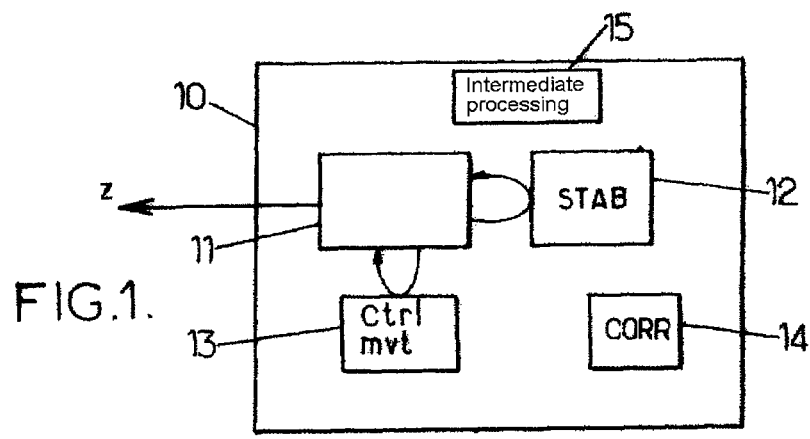
FIG. 1 shows an image capture system according to an embodiment of the present invention.

FIG. 1 shows an image capture system according to an embodiment of the present invention. This system 10 therefore comprises an image capture device 11 having a flux sensor matrix oriented along a sighting axis z. This sighting axis has an orientation controlled by a stabilization module 12. This stabilization module 12 can be a mechanical inertial stabilization module or a stabilization module operating by digital processing of the captured images. The present invention covers all types of image stabilization module and no limitation is implied.

In one embodiment, the stabilization module may take the form of inertial gyroscopes which are well known to those skilled in the art. The present invention is described below with reference to its application to an inertial stabilization module, without in any way limiting its application to other types of stabilization module.

In this case, despite the motions which may be imparted to the support of the image capture system, the gyroscopes orient the sighting axis independently of the angular and linear vibrations imparted to the support, thus providing the benefits of mechanical inertial stabilization and all the resulting advantages which are well known to those skilled in the art.

The present invention covers all types of support on which such an image capture system can be mounted. This support can, for example, be a person or any type of air, land or seagoing vehicle.

The support of the capture system 10 may be in motion along any trajectory or may be stationary. If the support is in motion, an embodiment of the present invention may be used where the orientation of the sighting axis is maintained in such a way that the same scene is captured over a period of time in spite of the motion of the support.

This image capture system with inertial stabilization additionally comprises a motion control module 13 which is adapted to impart a defined motion to the sighting axis. The present invention covers all types of motion control module which can impart a defined motion to the sighting axis of the image capture device. This motion control module 13 may, for example, be an opto-mechanical mechanism well known to those skilled in the art.

In an embodiment of the present invention, the defined motion imparted by the motion control module 13 to the sighting axis z is a cyclic motion. Thus the sighting axis periodically returns to the same orientations relative to the support on which the image capture system 10 is positioned.

A convolution product between a function f and a function g is a product, denoted by $\otimes$, defined by the following equation:

$$(f \otimes g)(x) = \int_{-\infty}^{\infty} f(x-t) \cdot g(t) \cdot dt = \int_{-\infty}^{\infty} f(t) \cdot g(x-t) \cdot dt$$

This convolution product corresponds to a multiplication in Fourier space.

A captured image $I_{capt}$, having the coordinates x and y in the sensor matrix in question, can obey the following equation when the sighting axis is not in motion, in other words when the captured image is not affected by motion blur:

$$I_{capt}(x,y) = PSF_{capt}(x,y) \otimes O(x,y) + B(x,y) \quad (1)$$

where $I_{capt}$ represents the image captured by the capture device at the sensor (x,y);

$PSF_{capt}(x, y)$ is the point spread function representing a blur without motion, in other words a blur which is not a motion blur and which is associated with the sensor (x, y) of the capture device;

O(x,y) denotes the actual scene captured by the capture device at the sensor (x,y), in other words the image captured by the captured device (x,y) without any blur or other noise due to the capture; and B(x,y) represents the sum of the temporal and spatial noises affecting the captured image $I_{capt}(x,y)$.

If the sighting axis of the capture device is subject to a motion according to an embodiment of the present invention, a captured image N, denoted I(x,y,N), obeys the following equation:

$$I(x,y,N) = PSF_{capt}(x,y) \otimes PSF_{motion}(x,y,N) \otimes B(x,y) \quad (2)$$

where $PSF_{capt}(X,Y)$ is a point spread function related to the blur introduced into the captured image at the sensor x,y;

$PSF_{motion}(x,y,N)$ is a point spread function related to the motion of the sighting axis; and B(x,y) obeys the following equation:

$$B(x, y) = \sum_{i=1}^{k} B(x, y, N_i)$$

where $B(x,y,N_i)$ is the sum of the temporal and spatial noises affecting a captured image with the index $N_i$.

The following equation may be applicable:

$$B(x,y,N_i) = B\text{temp}(x,y,N) + Bsf(x,y) + B\text{sam}(x,y,N_i)$$

where $B\text{temp}(x,y,N_i)$ represents the temporal photon or electron noise;

$Bsf(x,y)$ represents the fixed or slowly variable spatial noise;

and $B\text{sam}(x,y,N_i)$ represents the spatial noise due to sampling.

In an embodiment of the present invention, a series of images represented by the indices $N_1$ to $N_k$ is captured, where k is a whole number greater than 1, these k images being captured while the sighting axis of the sensor passes through a complete defined motion cycle.

Figure 2:
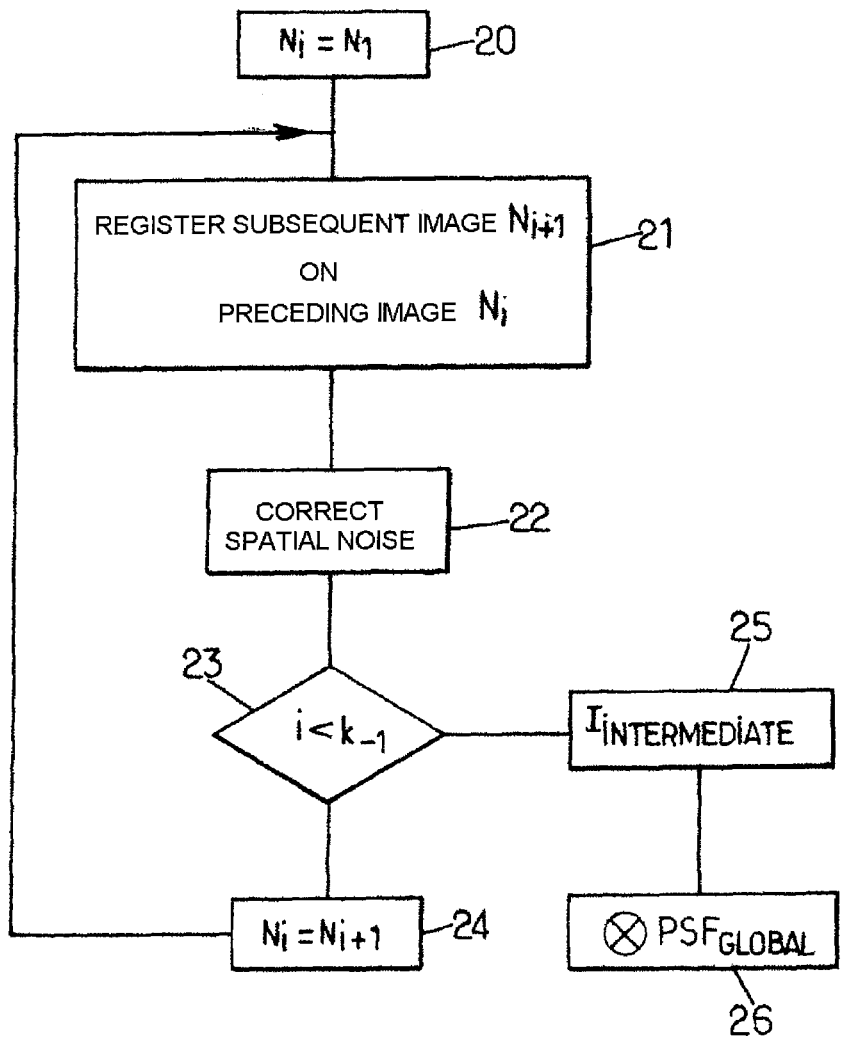
FIG. 2 shows the main steps of the method according to an embodiment of the present invention.

FIG. 2 shows the main steps of a processing method according to an embodiment of the present invention.

At a step 20, a variable $N_i$ is set to the value $N_1$ corresponding to the first image of the series of images captured in the course of a cycle according to an embodiment of the present invention.

In the next step 21, the image following this image $N_1$, in other words the image $N_2$, is registered on the image $N_1$, on the basis of the defined motion imparted to the sighting axis of the capture device. On the capture of each new image, $N_i$ in the series of images in question, the image is therefore registered on the preceding one; in other words, two images are stabilized in succession, one with respect to the other. This step of stabilization is intended to re-register two successively captured images, these two successive captured images having been offset on the basis of the motion of the sighting axis.

Spatial noise which can be detected relative to these two images $N_1$ and $N_2$ is then corrected in step 22.

In step 23, a check is made to determine whether the index i of the current image $N_i$, which is the image being processed, is smaller than the whole number k−1, in other words to check that the image $N_i$ is not the penultimate image of the series of captured images $N_{1-k}$. If this is the case, the system moves to the current image and increments the index i by one, at step 23.

Steps 21 and 22 are repeated on the next current image, for all the current images of the series of images $N_{i-k}$, with the exception of the last image $N_k$.

At the end of these repetitions of steps 21 and 22, an intermediate image $I_{intermediate}$ is obtained at a step 25.

This intermediate image corresponds to an image obtained from the images of the series $N_{1-k}$, by accumulation of the latter and by correction of the fixed spatial noise affecting this series of images.

Finally, a point spread function $PSF_{global}$ is applied by a convolution product to this intermediate image $I_{intermediate}$ in a step 26.

The way in which this corrective point spread function $PSF_{global}$ is obtained is described in part of the following text, according to an embodiment of the present invention.

By way of example, the motion of the sighting axis can be made to be a movement along a circular path at constant velocity. This motion corresponds to an image motion function in the form of a rectangle of length L obeying the following equation:

$$L = R \cdot \omega \cdot T_{integration}$$

where R is the radius of the circle described by the sighting axis in the controlled motion;

ω is an angle representing the orientation of the sighting axis in a polar coordinate frame of reference;

$T_{integration}$ is the integration time of the capture device, in other words the aperture time of the sensors of the capture device matrix.

The rectangle representing the image motion function then has a height of 1/L, the image motion function representing the displacement of a point of the image during the integration time.

It should be noted that the defined motion can also be imparted to the sighting axis at constant acceleration, instead of at constant velocity. In these conditions, the image motion function corresponds to a velocity in the form of a trapezium.

Taking all the orientations ω into consideration, the motion blur can then be considered as a cylinder with a surface area of S and a height of 1/S. The application of a motion blur of this kind to the captured image may be equivalent to the application of defocusing with a radius of L.

The following equation is then applicable:

$$PSF_{global}(x,y,N_{1-k}) = PSF_{capt}(x,y) \otimes Cycl(S,h) + B(x,y)$$

where x and y are the coordinates of pixels in an image captured by a sensor (x,y) of the sensor matrix;

$PSF_{global}$ is the corrective point spread function representing the motion blur associated with the sequence of images $N_{1-k}$ captured during the motion cycle of the sighting axis;

$PSF_{capt}(x,y)$ is the point spread function representing the motion blur associated with the capture device (x,y);

and B(x,y) obeys the following equation:

$$B(x, y) = \sum_{i=1}^{k} B(x, y, N_i)$$

where $B(x,y,N_i)$ is the sum of the temporal and spatial noises affecting a captured image with the index $N_i$.

The following equation may therefore be applicable:

$$B(x,y,N_i) = Btemp(x,y,N_i) + Bsf(x,y) + Bsam(x,y,N_i)$$

where $Btemp(x,y,N_i)$ represents the temporal photon or electron noise;

$Bsf(x,y)$ represents the fixed or slowly variable spatial noise;

$Bsam(x,y,N_i)$ represents the spatial noise due to sampling;

and Cycl(S, h) represents the motion blur for a motion describing a cylinder, where S and h obey the following respective equations:

$$S = \pi \cdot L^2;$$

$$h = 1/S.$$

Purely by way of illustration, it is assumed in the following description that the velocity V of the defined motion is constant, and has a component $V_x$ on the axis X and a component $V_y$ on the axis Y, where X and Y are the coordinate axes considered in the sensor matrix of the capture device.

In the context of a constant velocity of the motion of the sighting axis, step 21, in an embodiment of the present invention, is implemented on the basis of the following equation:

$$I_{stab}(x,y,N_i) = I(x,y,N_i) + I(x - V_x, y - V_y, N_{i-1})$$

where $I_{stab}$ is a stabilized image which is a registered image corresponding to the capture image $N_i$, at the sensor (x,y), based on the two successive captured images $N_i$ and $N_{i-1}$ in the series of images $N_{1-k}$;

$I(x,y,N_i)$ represents the image captured at the sensor (x,y) in capture $N_i$ of the series of captures $N_{1+k}$.

On the basis of this equation, it is possible to stabilize each image of the set of images in question, one with respect to another, in succession.

If the velocity V is substantially constant, the motion blur introduced into the series of captured images $N_1$ to Nk, in other words during a defined motion cycle of the sighting axis, can be described by a cylindrical function with a surface $S = P \cdot L^2$ and a height 1/S, where L corresponds to the length of the following vector:

$$\frac{T_{int}}{T_i} \cdot (V_x, V_y)$$

where $T_{int}$ corresponds to the integration time of the flux sensor (x,y), and Ti is the time interval elapsing between two successive image captures $N_i$ and $N_{i+1}$.

In an embodiment of the present invention, the point spread function corresponding to the motion blur introduced by a defined motion cycle into a series of captured images can then be written as follows:

$$PSF_{global}(x, y, N) = \frac{T_{int}}{T_i}.rect(V_x, V_y))$$

where $T_i$ represents the time elapsing between the captures of two consecutive images;

and rect(x,y) is a rectangular function with a length of x and a height of y at constant energy.

At step 25, if the velocity of the defined motion is constant, an intermediate image $I_{intermediate}$ can be obtained, obeying the following equation:

$$I_{intermediate}(x, y, N_{1-k}) = I(x, y, N_k) + \sum_{i=1}^{k} I(x - V_x, y - V_y, N_{i-1}) \quad (3)$$

where $N_{1-k}$ represents the series of k images captured according to an embodiment of the present invention.

Equation (4) below is then deduced from equations (2) and (3):

$$I_{intermediate}(x, y, N_{1-k}) =$$
$$\sum_{i=1}^{k} PSF_{capt}(x, y) \otimes PSF_{motion}(x, y, N_i) \otimes O(x, y) + B(x, y)$$

$$I_{intermediate}(x, y, N_{1-k}) =$$
$$PSF_{capt}(x, y) \otimes PSF_{global}(x, y, N_k) \otimes O(x, y) + B(x, y)$$

where B(x,y) represents the sum of the temporal and spatial noises affecting the images with the index $N_i$.

Equation (4) can also be written as follows, in the form of equation (5):

$$I_{intermediate}(x,y,N_{1-k}) = O(x,y) \otimes PSF_{capt}(x,y) \otimes PSF_{global}(x,y,N_k) + B(x,y) \quad (5)$$

At this stage, a corrective point spread function is advantageously determined from equation (5) above and is used to obtain a captured image in which several types of degradation are easily corrected.

This correction function $PSF_{global}$ obeys the following equation according to an embodiment of the present invention:

$$PSF_{global}(x, y, N_{1-k}) = PSF_{capt}(x, y) \otimes \sum_{i=1}^{k} PSF_{motion}(x, y, N_i) + B(x, y) \quad (6)$$

Thus this global correction function $PSF_{global}$ can be used to correct degradation of both types affecting a series of captured images. This, is done by applying a deconvolution product between an intermediate image obtained according to an embodiment of the present invention, on the basis of the series of captured images, and the corrective point spread function $PSF_{global}$ according to an embodiment of the present invention, in order to obtain a corrected image of the degradation introduced into the series of captured images by the spatial noise and the motion blur.

The temporal noise is also reduced in a ratio of the root of k, where k is the number of images in the series of images $N_{1-k}$. This reduction of the temporal noise can improve the result obtained after deconvolution.

By proceeding in this way it is possible to restore a series of images, not by considering each of these images individually, but in a global way, thus increasing the efficiency of the correction.

Furthermore, the corrective point spread function can advantageously be determined not on the basis of assumptions concerning the motion which may have been imparted to the sighting axis during the image capture, but on the basis of the actual motion imparted to this sighting axis.

Furthermore, by controlling the motion of the sighting axis in a capture system such as that described above, it is possible to define a motion which enables the motion blur to be reduced and permits easy determination of the associated point spread function $PSF_{motion}$.

Figure 3:
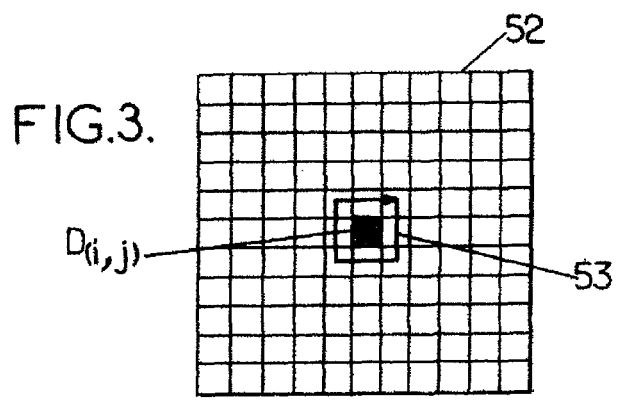
FIG. 3 shows a defined motion of the sighting axis relative to the flux sensor matrix of the image capture device according to an embodiment of the present invention.

FIG. 3 shows a matrix 52 of flux sensors D(i,j) of an image capture system according to an embodiment of the present invention, where i represents the row index of the matrix and j represents the line index.

The defined motion applied by the motion control module 13 advantageously enables different sensors D(i,j) of the sensor matrix 52 to capture the same point of a scene captured by the image capture system.

This defined motion preferably has, at the position of the flux sensor matrix 52, an amplitude of n pixels, where n is a whole number greater than 2 and less than $n_{max}$, $n_{max}$ being determined in such a way that the images captured in the course of a cycle have a predominantly common part.

This image capture system 10 also comprises an intermediate processing module 15 adapted to provide an intermediate image based on the series of images captured during a cycle of the defined motion, on the basis of a repetition of the following operations:

registering a subsequent image $N_{i+1}$ of said series of images on a preceding image $N_i$ as a function of the defined motion; and correcting a spatial noise related to the flux sensors and affecting the common part of the preceding and subsequent images on the basis of said defined motion, as a function of at least one measured offset between a value of a reference pixel $P_1$ in the common part of the preceding image and a value of a subsequent pixel $P_2$ which represents the same point of said scene as said reference pixel in said common part of a subsequent image.

It also comprises a correction module 14 adapted to provide a corrected captured image of the scene by applying a convolution product between the intermediate image and a corrective point spread function $PSF_{global}$, this corrective point spread function being determined on the basis of the defined motion.

The motion control module 13 can be adapted to apply a defined motion corresponding to a circle having a diameter greater than or equal to three pixels at the position of the flux sensor matrix.

The motion control module 13 can be adapted to apply a defined motion having a velocity which is determined as a function of an integration time of the flux sensors of the image capture device.

Figure 4:
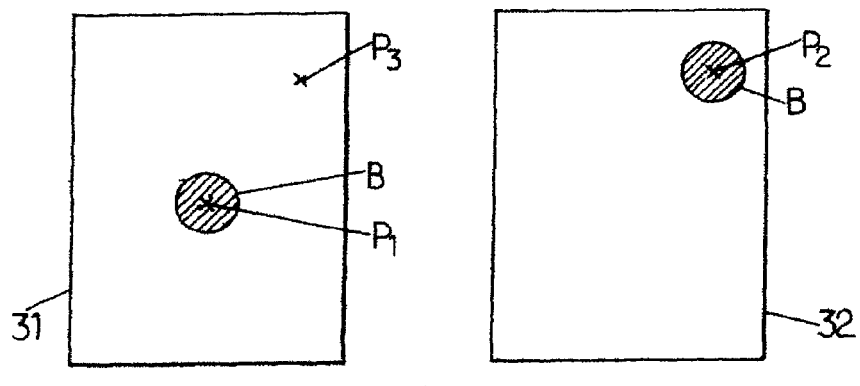
FIG. 4 shows a spatial noise correction applied to a preceding image and a subsequent image of the series of captured images according to an embodiment of the present invention.

The correction module can be adapted in such a way that values of pixels of the common part of a preceding image 31 and a subsequent image 32, as shown in FIG. 4, are corrected in succession, by moving along a chain of pixels which, starting from the reference pixel $P_1$ in the preceding image, comprise pixels corresponding to each other alternately in the subsequent image and in the preceding image, with a pixel of the subsequent image corresponding to a pixel of the preceding image when said pixels correspond to the same point of the captured scene, and with a pixel of the preceding image corresponding to a pixel of the subsequent image when said pixels correspond to the same flux sensor of the sensor matrix.

The correction module can also be adapted to determine the position of the reference pixel $P_1$ in the common part as a function of the defined motion and of a time interval which elapses between the two images.

The correction module can be adapted to determine the position of the subsequent pixel $P_2$ in the subsequent image 32, starting from the position of the reference pixel $P_1$ in the preceding image, as a function of information relating to the defined motion which is provided by the motion control module, and as a function of a time interval which elapses between the preceding and subsequent images.

The correction module 14 can be adapted to determine the defined motion by using a method of digital processing of the preceding and subsequent images, such as that described in FR 2 828 315.

FIG. 3 shows a defined motion 53 according to an embodiment of the present invention, relating to the flux sensor matrix of the image capture device. This defined motion causes a displacement of the sighting axis, at the position of the sensor matrix, along a square of pixels whose sides have a length of three pixels.

In these conditions, when the motion also has a velocity which enables a pixel to move between two consecutively captured images, 8 different sensors of the matrix 52 capture the same point of the scene captured in one cycle of the defined motion, in other words the pixels positioned along the perimeter of the square shown in FIG. 2.

It is also possible to impart a defined motion having an amplitude of more than three pixels.

It is also possible to make the sighting axis describe a circle with a diameter of three pixels or more, instead of a square, at the sensor matrix 52.

As a general rule, the sighting axis at the sensor matrix is subjected, on the one hand, to a minimal amplitude of motion so as to ensure that the correction of the spatial noise is appropriate, because it is then carried out on a representative sample of sensors of the sensor matrix. Then, on the other hand, this amplitude of motion is made to be less than a maximal value which is determined in such a way as to ensure that a large common part of the captured scene is present in all the images which are captured during a cycle of the defined motion imparted to the sighting axis.

FIG. 4 shows a spatial noise correction applied to a preceding image and a subsequent image in the series of captured images.

Two successive images, namely a preceding image 31 and a subsequent image 32, are captured according to an embodiment of the present invention. A ball B is shown in the center of the preceding image 31, and is then shown in the right-hand corner of the subsequent image 32, since the sighting axis has been displaced between the moments of the capture of the two successive images 31 and 32, according to the defined motion imparted by the motion control module 13.

The pixels in a captured image are identified in the frame of reference of the sensor matrix 52, which comprises the sensors D (i,j) where i is in the range from 1 to the total number of rows of the matrix 52 and j is in the range from 1 to the total number of columns of the matrix 52.

The central sensor D(x,y) of the sensor matrix captures a central point of the ball B for the preceding image 31. Since the sighting axis z is oriented differently for the capture of the subsequent image 32, the central point of the ball B is then captured by another sensor D(x',y') of the sensor matrix.

Theoretically, the pixels representing the central point of the ball B in the preceding image 31 and in the subsequent image 32 should be set to the same value.

If this is not the case in practice, it is desirable to rectify the situation.

For this purpose, in an embodiment of the present invention, the first stage is the determination of the motion to which all the sensors of the sensor matrix have been subjected between the moment of the capture of the preceding image 31 and the moment of the capture of the subsequent image 32.

Given that this motion corresponds to the defined motion controlled by the motion control module 13, in the image capture system 10, this motion, in other words its form and velocity, is known.

It is therefore easy to determine, for a reference pixel $P_1$ of the preceding image 31, a corresponding subsequent pixel in the subsequent image 32, in other words a pixel representing the same point of scene as that captured in the subsequent image 32.

An offset between the value $V(P_1)$, of the reference pixel and the value $V(P_2)$ of the subsequent pixel is then calculated, and the resulting offset obeys the following equation:

$$\delta = V(P_2) - V(P_1)$$

This offset $\delta$ is then used to correct the value of a pixel $P_1$ of the preceding image, which has been captured by the sensor D(x,y), as a function of the value of the pixel $P_2$. This results in a corrected value $V_{cor}$ of the pixel $P_1$ which obeys the following equation:

$$V_{cor}(P_1) = V(P_1) + \delta$$

This spatial noise correction method can be applied to all the pixels corresponding to the same scene in the two images in question.

In an embodiment of the present invention, a propagation of the offset correction is applied in the following manner. The offset $\delta$ as determined above can also be used to correct the value of a third pixel $P_3$ in the preceding image 31 corresponding to the sensor D(x',y'). This is because this value is affected by the same offset $\delta$ and can therefore be corrected to provide a corrected value $V_{corr}(P_3)$ which obeys the following equation:

$$V_{corr}(P_3) = V(P_3) + \delta$$

On the basis of this corrected pixel value, it is then possible to correct a fourth pixel $P_4$ which has been captured by a sensor D(x", y"), which has captured the same point of the scene as the sensor D(x',y') for the preceding image. This is because the corrected value of this pixel $P_4$ obeys the following equation:

$$V_{corr}(P_4) = V_{corr}(P_3).$$

The offset $\delta$ is then applied to the value of the pixel of the image 31 which has been captured by the sensor D(x", y") of the sensor matrix 52. In this way it is possible to move along a chain of pixels which can be corrected in succession and alternately between the preceding image 31 and the subsequent image 32.

By proceeding in this way, values of pixels of the common part of the preceding image 31 and of the subsequent image 32 are corrected successively, by moving along a chain of pixels comprising, in succession, from a reference pixel in the preceding image, pixels which correspond alternately to each other in the subsequent and preceding images. In such a chain of pixels, a pixel of the subsequent image corresponds to a pixel of the preceding image when it represents the same point of the captured scene, and a pixel of the subsequent image corresponds to a pixel of the preceding image when these two pixels correspond to the same flux sensor in the sensor matrix 52.

In the above description, the motion of a pixel from a preceding image to a subsequent image is determined on the basis of the knowledge that the image capture system 10 has of this mechanical motion.

It is possible that this knowledge of the defined motion may be insufficiently precise. This is the case, for example, when the defined motion is affected by noise in practice.

In such a case, the defined motion which is theoretically imparted to the sighting axis z is different from the motion which is really imparted. In these circumstances, it may be advantageous to determine the motion of this sighting axis at the position of the sensor matrix on the basis of digital processing of the captured images.

A digital processing method of this kind for determining the motion of the sighting axis between two consecutively captured images is described in U.S. Pat. No. 5,502,482 and also in FR 2828315.

An embodiment of the present invention can advantageously be used in a context in which a substantially static scene is captured, because it enables the quality of the captured images to be improved by reducing both the spatial and the temporal noise.

In an embodiment of the present invention, it is possible to operate on the basis of data which can be determined from the image stabilization, to provide a simple way of estimating the image motion function, these data relating to the pitch, roll and yaw of the processed images. In order to estimate the image motion function more precisely, it is also possible to allow for the system configuration data such as the operating temperature or a scale factor between the angular dimensions of the image space and the linear dimensions of the sensor matrix.

In certain cases, it is also possible to represent the image motion function in a suitable frame of reference which enables the necessary calculations to be markedly simplified. For example, it should be noted that, if the image motion function is represented in polar coordinates, it may be a one dimensional function, this one dimensional function being different in each frame.

The invention claimed is:

1. A method of processing images in a system for capturing a series of images of a scene comprising an image capture device having a matrix of flux sensors oriented along a sighting axis (z),
    said image capture device comprising a stabilization module which stabilizes the sighting axis of the captured images, said sighting axis being subjected to a specified cyclic motion having an amplitude of n pixels in each cycle at the flux sensor matrix, n being a whole number greater than 2 and smaller than $n_{max}$, $n_{max}$ being determined in such a way that the images captured in each cycle have a predominantly common part;
    said method comprising the following steps, applied to a series of successive images ($N_{1-k}$) captured during a cycle:
    /1/ repeating steps /i/ and /ii/ from the first captured image to the last captured image of said series and an intermediate image ($I_{intermediate}$) is obtained:
        /i/ registering a subsequent image ($N_{i+1}$) of said series of images on a preceding image ($N_i$) as a function of the defined motion;
        /ii/ correcting a spatial noise due to the flux sensors and affecting the common part of the images of the preceding and subsequent images as a function of at least one measured offset between a value of a reference pixel ($P_1$) in the common part of the preceding image and a value of a subsequent pixel ($P_2$) which represents the same point of said scene as said reference pixel in said common part of the subsequent image;
    /2/ obtaining a corrected captured image of the scene by applying a convolution product between said intermediate image and a corrective point spread function ($PSF_{global}$), said corrective point spread function being determined according to the defined motion.

2. The image processing method as claimed in claim 1, wherein the defined motion is provided at constant velocity or at constant acceleration.

3. The image processing method as claimed in claim 1, wherein the corrective point spread function obeys the following equation:

$$PSF_{global}(x, y, N_{1-k}) = PSF_{capt}(x, y) \otimes \sum_{i=1}^{k} PSF_{motion}(x, y, N_i) + B(x, y)$$

where $PSF_{global}$ is the corrective point spread function;
x and y are coordinates of a sensor within the sensor matrix;
$N_{1-k}$ is the series of captured images, each captured image being represented by an index $N_i$ where i is in the range from 1 to k, k being greater than 1;
$PSF_{capt}$ is a point spread function relating to the capture device at a sensor with the coordinates x and y in the matrix;
$PSF_{motion}$ is a point spread function relating to the defined motion of the sighting axis; and
B(x,y) obeys the following equation:

$$B(x, y) = \sum_{i=1}^{k} B(x, y, N_i)$$

where $B(x,y,N_i)$ is the sum of the temporal and spatial noises affecting a captured image with the index $N_i$.

4. The image processing method as claimed in claim 1, wherein the stabilization module is adapted to stabilize the captured images on the basis of a digital processing of the images.

5. The image processing method as claimed in claim 1, wherein the stabilization module is a mechanical inertial stabilization module.

6. The image processing method as claimed in claim 1, wherein the defined motion is a circle having a diameter greater than or equal to three pixels at the position of the flux sensor matrix.

7. The image processing method as claimed in claim 1, wherein the velocity of the defined motion is determined as a function of an integration time of the flux sensors of the sensor matrix of the image capture device.

8. The image processing method as claimed in claim 1, wherein values of pixels of the common part of the preceding image and the subsequent image are corrected in succession, on the basis on the measured offset, by moving along a chain of pixels which, starting from the reference pixel ($P_1$) in the preceding image, comprise pixels corresponding to each other alternately in the subsequent image and in the preceding image, with a pixel of the subsequent image corresponding to a pixel of the preceding image when said pixels correspond to the same point of the captured scene, and with a pixel of the preceding image corresponding to a pixel of the subsequent image when said pixels correspond to the same flux sensor of the sensor matrix.

9. The image processing method as claimed in claim 8, wherein the position of the reference pixel ($P_1$) in the common part is determined as a function of the defined motion and of a time interval which elapses between said images.

10. The image processing method as claimed in claim 1, wherein the position of the subsequent pixel in the subsequent image is determined on the basis of the position of the reference pixel in the preceding image as a function of characteristics of the defined motion imparted to the sighting axis and of a time interval which elapses between said images.

11. The image processing method as claimed in claim 1, wherein the defined motion is determined by the application of digital processing of the preceding and subsequent images.

12. A system for capturing a series of images of a scene, comprising an image capture device having a matrix of flux sensors oriented along a sighting axis,
said capture system comprising:
a stabilization module which stabilizes the sighting axis of the captured images;
a motion control module which is adapted to impart to the sighting axis a motion which is defined and cyclic and has an amplitude of n pixels over one cycle at the position of the flux sensor matrix, where n is a whole number greater than 2 and smaller than $n_{max}$, $n_{max}$ being determined in such a way that the images captured in the course of a cycle have a predominantly common part;
an intermediate processing module adapted to provide an intermediate image based on the series of images captured during a cycle of the defined motion, on the basis of a repetition of the following operations:
registering a subsequent image ($N_{i+1}$) of said series of images on a preceding image ($N_i$) as a function of the defined motion;
correcting a spatial noise relating to the flux sensors and affecting the common part of the preceding and subsequent images on the basis of said defined motion, as a function of at least one measured offset between a value of a reference pixel ($P_1$) in the common part of the preceding image and a value of a subsequent pixel ($P_2$) which represents the same point of said scene as said reference pixel in said common part of a subsequent image;
a correction module adapted to provide a corrected captured image of the scene by applying a convolution product between the intermediate image and a corrective point spread function ($PSF_{global}$), said corrective point spread function being determined on the basis of the defined motion.

13. The image processing system as claimed in claim 12, wherein the motion control module is adapted to impart the defined motion at constant velocity or at constant acceleration.

14. The image processing system as claimed in claim 12, wherein the corrective point spread function obeys the following equation:

$$PSF_{global}(x, y, N_{1-k}) = PSF_{capt}(x, y) \otimes \sum_{i=1}^{k} PSF_{motion}(x, y, N_i) + B(x, y)$$

where $PSF_{global}$ is the corrective point spread function;
x and y are the coordinates of a sensor within the sensor matrix;
$N_{1-k}$ is the series of captured images, each captured image being represented by an index $N_i$ where i is in the range from 1 to k, k being greater than 1;
$PSF_{capt}$ is a point spread function relating to the capture device at a sensor with the coordinates x and y in the matrix;
$PSF_{motion}$ is a point spread function relating to the defined motion of the sighting axis; and
B(x,y) obeys the following equation:

$$B(x, y) = \sum_{i=1}^{k} B(x, y, N_i)$$

where $B(x,y,N_i)$ is the sum of the temporal and spatial noises affecting a captured image with the index $N_i$.

15. The capture system as claimed in claims 12, wherein the motion control module is adapted to impart a defined motion corresponding to a circle having a diameter greater than or equal to three pixels at the position of the flux sensor matrix.

16. A non-transitory computer readable storage medium storing a computer program which when executed by a processor implements a method of processing images in a system for capturing a series of images of a scene comprising an image capture device having a matrix of flux sensors oriented along a sighting axis (z),
said image capture device comprising a stabilization module which stabilizes the sighting axis of the captured images, said sighting axis being subjected to a specified cyclic motion having an amplitude of n pixels in each cycle at the flux sensor matrix, n being a whole number greater than 2 and smaller than $n_{max}$, $n_{max}$ being determined in such a way that the images captured in each cycle have a predominantly common part;
said method comprising the following steps, applied to a series of successive images ($N_{1-k}$) captured during a cycle:
/1/repeating steps /i/ and /ii/ from the first captured image to the last captured image of said series and an intermediate image ($I_{intermediate}$) is obtained:
/i/ registering a subsequent image ($N_{i+1}$) of said series of images on a preceding image ($N_i$) as a function of the defined motion;
/ii/ correcting a spatial noise due to the flux sensors and affecting the common part of the images of the preceding and subsequent images as a function of at least one measured offset between a value of a reference pixel ($P_1$) in the common part of the preceding image and a value of a subsequent pixel ($P_2$) which represents the same point of said scene as said reference pixel in said common part of the subsequent image when the program is executed by processing means of the capture system.

* * * * *